F. CAPRON.
PRODUCTION OF NEUTRAL AMMONIUM SULFATE.
APPLICATION FILED SEPT. 17, 1917.
1,266,212. Patented May 14, 1918.
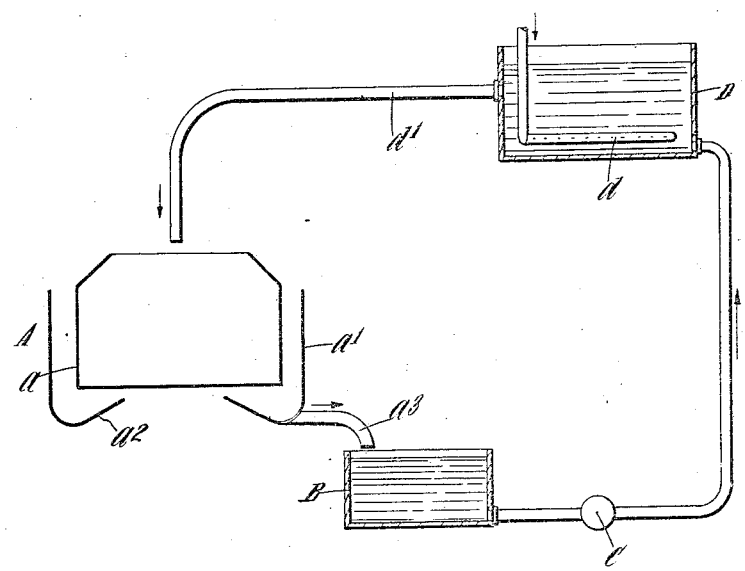

UNITED STATES PATENT OFFICE.

FELIX CAPRON, OF GRAY'S INN ROAD, LONDON, ENGLAND.

PRODUCTION OF NEUTRAL AMMONIUM SULFATE.

1,266,212.   Specification of Letters Patent.   Patented May 14, 1918.

Application filed September 17, 1917. Serial No. 191,851.

*To all whom it may concern:*

Be it known that I, FELIX CAPRON, a subject of the King of Spain, residing at 23 Calthorpe street, Gray's Inn Road, in the county of London, England, have invented certain new and useful Improvements in or Relating to the Production of Neutral Ammonium Sulfate, of which the following is a specification.

This invention relates to the production of neutral ammonium sulfate by treatment in an inexpensive and efficient manner of the already manufactured sulfate crystals obtained by any of the usual methods, so as to produce a neutral sulfate from the usual acidulated salt. Ammonium sulfate as obtained by any of the ordinary industrial processes is more or less acid in character owing to the retention of some of the acid mother liquor in which the sulfate crystals are formed. The acid impurities render the salt hygroscopic and give rise to various injurious actions in the commercial application of the sulfate and it is of importance to obtain a neutral salt.

According to this invention the impure crystallized ammonium sulfate is subjected to a washing treatment by a saturated and neutral solution of ammonium sulfate until the solution leaving the crystallized sulfate shows no appreciable acidity. The solution leaves the neutral ammonium sulfate unaffected, as being already saturated at the temperature of treatment it can dissolve no more of the neutral sulfate but washes out the acid impurities so that on centrifuging, filtering or otherwise separating the crystals from the liquid only the neutral sulfate remains.

The neutral solution can be obtained by neutralizing (preferably by means of ammonia) the acid mother liquor extracted from the sulfate. The washing treatment is continued as long as acidity is found in the solution as it leaves the crystals. When acidity is no longer detected the sulfate is quite neutral, all the adhering acid having been washed out. The absence of an acid reaction in the cleansing solution finally leaving the crystallized salt is a distinguishing feature of the present process. The neutral solution may be prepared by dissolving neutralized crystals or by using a portion of the salt under treatment, beginning the operation with steam or water which dissolves part of the salt as it passes through, the solution being returned after neutralization to complete the washing action, or in any other manner found commercially suitable, and the purifying operation may be carried out by a continuous, intermittent or any other appropriate process, applied either at the time of manufacture of the sulfate, but after the formation of the crystals, or at a later period. It may be effected by centrifuging, filter pressing, levigation, immersion or other well known method, and completed in a single operation or in successive stages. The exact temperature at which the operation is carried out is not material and may be atmospheric, but at higher temperatures, say 100° C., the action is more rapid. The strength of the solution depends, of course, upon the temperature but the only requirement as to strength is that the solution shall be practically saturated at the temperature of the operation so that the neutral sulfate is not dissolved in appreciable quantities.

The acids adhering to the salt are all recovered in the washing solution and on neutralizing the now acidulated solution they are obtained as salts and may form part of the solution employed for treatment of fresh acid sulfate.

As an example of a type of apparatus which may be employed the accompanying diagram is given, but it is to be understood that this invention is not restricted to any special class of apparatus or method of carrying out the purifying operation.

In the diagram A is a centrifugal apparatus of usual type into the rotary basket $a$ of which the impure crystals are fed, the liquid driven from the crystals being received by the outer casing $a'$ and collected in the annular channel $a^2$ whence it flows through the outlet pipe $a^3$ into the tank B. From this tank the liquid is raised by the pump C into the saturator D which is provided with a perforated pipe $d$ through which ammoniacal vapors are caused to pass through the liquid and neutralize all the acid which has been extracted from the crystals in the centrifugal machine. The liquid may have a slightly alkaline reaction when it leaves the saturator by the pipe $d'$ to flow again into the rotary basket $a$, as a little alkalinity directly neutralizes some of the acid in the crystals. The solution emerging from the outlet pipe $a^3$ is tested and as soon as it is found to be neutral the operation is complete and the supply of solution is stopped, till the centrifugal machine receives a fresh quantity of impure sulfate.

What I claim and desire to secure by Letters Patent of the United States is:—

1. The process of obtaining neutral ammonium sulfate which consists in subjecting the already crystallized acidulated sulfate to a washing treatment by a practically saturated and substantially neutral solution of ammonium sulfate until the solution leaving the crystals shows no acidity.

2. The process of obtaining neutral ammonium sulfate which consists in passing a practically saturated and substantially neutral solution of ammonium sulfate through the already crystallized acidulated sulfate, neutralizing the acidulated solution after it leaves the sulfate and passing the reneutralized solution through the crystallized sulfate until the latter is freed from acid.

3. The process of obtaining neutral ammonium sulfate which consists in centrifuging the crystallized sulfate and in supplying to the said sulfate during the centrifuging operation a practically saturated and substantially neutral solution of ammonium sulfate until the solution leaves the crystallized sulfate in neutral condition.

4. The process of obtaining neutral ammonium sulfate which consists in centrifuging the crystallized sulfate, supplying it during the centrifuging operation with a practically saturated and substantially neutral solution of ammonium sulfate, re-neutralizing the acidulated solution leaving the said crystallized sulfate and returning it to the sulfate until the discharged solution is neutral.

FELIX CAPRON.